United States Patent
Akino et al.

(10) Patent No.: US 11,997,335 B2
(45) Date of Patent: May 28, 2024

(54) COST CALCULATION SYSTEM, COST CALCULATION APPARATUS AND PROGRAM

(71) Applicant: DENTSU INC., Tokyo (JP)

(72) Inventors: Rina Akino, Tokyo (JP); Dai Arakawa, Tokyo (JP); Tomohiro Kawase, Tokyo (JP); Wataru Kishimoto, Tokyo (JP)

(73) Assignee: DENTSU INC., Tokyo (JP)

( * ) Notice: Subject to any disclaimer, the term of this patent is extended or adjusted under 35 U.S.C. 154(b) by 8 days.

(21) Appl. No.: 17/917,100

(22) PCT Filed: Mar. 31, 2021

(86) PCT No.: PCT/JP2021/014076
§ 371 (c)(1),
(2) Date: Oct. 5, 2022

(87) PCT Pub. No.: WO2021/205971
PCT Pub. Date: Oct. 14, 2021

(65) Prior Publication Data
US 2023/0156255 A1 May 18, 2023

(30) Foreign Application Priority Data
Apr. 8, 2020 (JP) .................. 2020-069945

(51) Int. Cl.
*H04N 21/262* (2011.01)
*G06Q 30/0242* (2023.01)
*G06Q 30/0273* (2023.01)
*H04N 21/81* (2011.01)

(52) U.S. Cl.
CPC ....... *H04N 21/262* (2013.01); *G06Q 30/0242* (2013.01); *G06Q 30/0273* (2013.01); *H04N 21/812* (2013.01)

(58) Field of Classification Search
None
See application file for complete search history.

(56) References Cited

U.S. PATENT DOCUMENTS

2009/0119172 A1* 5/2009 Soloff ................ G06Q 30/0251
705/344
2010/0262486 A1* 10/2010 Matsunaga ........ H04N 7/17318
705/14.43
2021/0224854 A1 7/2021 Akino et al.

FOREIGN PATENT DOCUMENTS

JP 2000-124867 4/2000
JP 6619116 12/2019

OTHER PUBLICATIONS

International Search Report (ISR) from International Searching Authority (Japan Patent Office) in International Pat. Appl. No. PCT/JP2021/014076, dated Apr. 27, 2021, together with an English language translation.

* cited by examiner

*Primary Examiner* — James R Marandi
(74) *Attorney, Agent, or Firm* — Greenblum & Bernstein, P.L.C.

(57) ABSTRACT

More flexible planning is suitably realized. A cost calculation system according to one aspect of the present disclosure includes: an obtaining section that obtains information for identifying an effective zone including an advertisement slot in which a spot Commercial Message (CM) is desired to be intensively broadcast; and a control section that calculates cost per Gross Rating Point (GRP) in a case where the spot CM is intensively allocated to the effective zone.

5 Claims, 7 Drawing Sheets

|  | MON | TUE | WED | THU | FRI | SAT | SUN |
|---|---|---|---|---|---|---|---|
| 5:00 - 6:00 |  |  |  |  |  |  |  |
| 6:00 - 7:00 |  |  |  |  |  |  |  |
| 7:00 - 8:00 |  |  |  |  |  |  |  |
| 8:00 - 9:00 |  |  |  |  |  |  |  |
| 9:00 - 10:00 |  |  |  |  |  |  |  |
| 10:00 - 11:00 |  |  |  |  |  |  |  |
| 11:00 - 12:00 |  |  |  |  |  |  |  |
| 12:00 - 13:00 |  |  |  |  |  |  |  |
| 13:00 - 14:00 |  |  |  |  |  |  |  |
| 14:00 - 15:00 |  |  |  |  |  |  |  |
| 15:00 - 16:00 |  |  |  |  |  |  |  |
| 16:00 - 17:00 |  |  |  |  |  |  |  |
| 17:00 - 18:00 |  |  |  | ● | ● | ● |  |
| 18:00 - 19:00 |  |  |  | ● | ● | ● |  |
| 19:00 - 20:00 |  |  |  | ● | ● | ● |  |
| 20:00 - 21:00 |  |  |  |  |  |  |  |
| 21:00 - 22:00 |  |  |  |  |  |  |  |
| 22:00 - 23:00 |  |  |  |  |  |  |  |
| 23:00 - 24:00 |  |  |  |  |  |  |  |
| 24:00 - 25:00 |  |  |  |  |  |  |  |
| 25:00 - 26:00 |  |  |  |  |  |  |  |
| 26:00 - 27:00 |  |  |  |  |  |  |  |
| 27:00 - 28:00 |  |  |  |  |  |  |  |
| 28:00 - 29:00 |  |  |  |  |  |  |  |
 ESP ZONE
 ZONE THAT DOES NOT CORRESPOND TO ESP ZONE
FIG. 3

|  | MON | TUE | WED | THU | FRI | SAT | SUN |
|---|---|---|---|---|---|---|---|
| 5:00 - 6:00 | 1.0025 | 1.0025 | 1.0025 | 1.0025 | 1.0025 | 1.0025 | 1.0025 |
| 6:00 - 7:00 | 1.0065 | 1.0065 | 1.0065 | 1.0065 | 1.0065 | 1.0070 | 1.0070 |
| 7:00 - 8:00 | 1.0065 | 1.0065 | 1.0065 | 1.0065 | 1.0065 | 1.0070 | 1.0070 |
| 8:00 - 9:00 | 1.0065 | 1.0065 | 1.0065 | 1.0065 | 1.0065 | 1.0070 | 1.0070 |
| 9:00 - 10:00 | 1.0025 | 1.0025 | 1.0025 | 1.0025 | 1.0025 | 1.0070 | 1.0070 |
| 10:00 - 11:00 | 1.0025 | 1.0025 | 1.0025 | 1.0025 | 1.0025 | 1.0070 | 1.0070 |
| 11:00 - 12:00 | 1.0025 | 1.0025 | 1.0025 | 1.0025 | 1.0025 | 1.0070 | 1.0070 |
| 12:00 - 13:00 | 1.0095 | 1.0095 | 1.0095 | 1.0095 | 1.0095 | 1.0070 | 1.0070 |
| 13:00 - 14:00 | 1.0095 | 1.0095 | 1.0095 | 1.0095 | 1.0095 | 1.0070 | 1.0070 |
| 14:00 - 15:00 | 1.0025 | 1.0025 | 1.0025 | 1.0025 | 1.0025 | 1.0070 | 1.0070 |
| 15:00 - 16:00 | 1.0025 | 1.0025 | 1.0025 | 1.0025 | 1.0025 | 1.0070 | 1.0070 |
| 16:00 - 17:00 | 1.0025 | 1.0025 | 1.0025 | 1.0025 | 1.0025 | 1.0070 | 1.0070 |
| 17:00 - 18:00 | 1.0025 | 1.0025 | 1.0025 | 1.0025 | 1.0025 | 1.0070 | 1.0070 |
| 18:00 - 19:00 | 1.0025 | 1.0025 | 1.0025 | 1.0025 | 1.0025 | 1.0070 | 1.0070 |
| 19:00 - 20:00 | 1.0032 | 1.0032 | 1.0032 | 1.0032 | 1.0032 | 1.0032 | 1.0032 |
| 20:00 - 21:00 | 1.0032 | 1.0032 | 1.0032 | 1.0032 | 1.0032 | 1.0032 | 1.0032 |
| 21:00 - 22:00 | 1.0032 | 1.0032 | 1.0032 | 1.0032 | 1.0032 | 1.0032 | 1.0032 |
| 22:00 - 23:00 | 1.0032 | 1.0032 | 1.0032 | 1.0032 | 1.0032 | 1.0032 | 1.0032 |
| 23:00 - 24:00 | 1.0030 | 1.0030 | 1.0030 | 1.0030 | 1.0030 | 1.0030 | 1.0030 |
| 24:00 - 25:00 | 1.0030 | 1.0030 | 1.0030 | 1.0030 | 1.0030 | 1.0030 | 1.0030 |
| 25:00 - 26:00 | 1.0030 | 1.0030 | 1.0030 | 1.0030 | 1.0030 | 1.0030 | 1.0030 |
| 26:00 - 27:00 | 1.0025 | 1.0025 | 1.0025 | 1.0025 | 1.0025 | 1.0025 | 1.0025 |
| 27:00 - 28:00 | 1.0025 | 1.0025 | 1.0025 | 1.0025 | 1.0025 | 1.0025 | 1.0025 |
| 28:00 - 29:00 | 1.0025 | 1.0025 | 1.0025 | 1.0025 | 1.0025 | 1.0025 | 1.0025 |

FIG. 4

|  | MON | TUE | WED | THU | FRI | SAT | SUN |
|---|---|---|---|---|---|---|---|
| 5:00 - 6:00 | 1.0025 | 1.0025 | 1.0025 | 1.0025 | 1.0025 | 1.0025 | 1.0025 |
| 6:00 - 7:00 | 1.0065 | 1.0065 | 1.0065 | 1.0065 | 1.0065 | 1.0070 | 1.0070 |
| 7:00 - 8:00 | 1.0065 | 1.0065 | 1.0065 | 1.0065 | 1.0065 | 1.0070 | 1.0070 |
| 8:00 - 9:00 | 1.0065 | 1.0065 | 1.0065 | 1.0065 | 1.0065 | 1.0070 | 1.0070 |
| 9:00 - 10:00 | 1.0025 | 1.0025 | 1.0025 | 1.0025 | 1.0025 | 1.0070 | 1.0070 |
| 10:00 - 11:00 | 1.0025 | 1.0025 | 1.0025 | 1.0025 | 1.0025 | 1.0070 | 1.0070 |
| 11:00 - 12:00 | 1.0025 | 1.0025 | 1.0025 | 1.0025 | 1.0025 | 1.0070 | 1.0070 |
| 12:00 - 13:00 | 1.0095 | 1.0095 | 1.0095 | 1.0095 | 1.0095 | 1.0070 | 1.0070 |
| 13:00 - 14:00 | 1.0095 | 1.0095 | 1.0095 | 1.0095 | 1.0095 | 1.0070 | 1.0070 |
| 14:00 - 15:00 | 1.0025 | 1.0025 | 1.0025 | 1.0025 | 1.0025 | 1.0070 | 1.0070 |
| 15:00 - 16:00 | 1.0025 | 1.0025 | 1.0025 | 1.0025 | 1.0025 | 1.0070 | 1.0070 |
| 16:00 - 17:00 | 1.0025 | 1.0025 | 1.0025 | 1.0025 | 1.0025 | 1.0070 | 1.0070 |
| 17:00 - 18:00 | 1.0025 | 1.0025 | 1.0025 | 1 | 1 | 1 | 1.0070 |
| 18:00 - 19:00 | 1.0025 | 1.0025 | 1.0025 | 1 | 1 | 1 | 1.0070 |
| 19:00 - 20:00 | 1.0032 | 1.0032 | 1.0032 | 1 | 1 | 1 | 1.0032 |
| 20:00 - 21:00 | 1.0032 | 1.0032 | 1.0032 | 1.0032 | 1.0032 | 1.0032 | 1.0032 |
| 21:00 - 22:00 | 1.0032 | 1.0032 | 1.0032 | 1.0032 | 1.0032 | 1.0032 | 1.0032 |
| 22:00 - 23:00 | 1.0032 | 1.0032 | 1.0032 | 1.0032 | 1.0032 | 1.0032 | 1.0032 |
| 23:00 - 24:00 | 1.0030 | 1.0030 | 1.0030 | 1.0030 | 1.0030 | 1.0030 | 1.0030 |
| 24:00 - 25:00 | 1.0030 | 1.0030 | 1.0030 | 1.0030 | 1.0030 | 1.0030 | 1.0030 |
| 25:00 - 26:00 | 1.0030 | 1.0030 | 1.0030 | 1.0030 | 1.0030 | 1.0030 | 1.0030 |
| 26:00 - 27:00 | 1.0025 | 1.0025 | 1.0025 | 1.0025 | 1.0025 | 1.0025 | 1.0025 |
| 27:00 - 28:00 | 1.0025 | 1.0025 | 1.0025 | 1.0025 | 1.0025 | 1.0025 | 1.0025 |
| 28:00 - 29:00 | 1.0025 | 1.0025 | 1.0025 | 1.0025 | 1.0025 | 1.0025 | 1.0025 |

FIG. 5

COST CALCULATION SYSTEM, COST CALCULATION APPARATUS AND PROGRAM

TECHNICAL FIELD

The present disclosure relates to a cost calculation system, a cost calculation apparatus and a program.

BACKGROUND ART

For example, a Commercial Message (CM) is broadcast as an advertisement by television broadcasting. The CMs are roughly classified into time CMs and spot CMs. The time CM is, for example, a CM that is broadcast in a slot bought and sold together with a program, and may be a program commercial, a program CM and a sponsored CM.

The spot CM corresponds to a CM that is broadcast in a CM time slot defined by a television station. The spot CM is classified into a Station Break (SB) that is broadcast between programs, and a Participation (PT) (or a participating CM) that is inserted during a program yet does not display a sponsor.

Planning (that may be referred to as, for example, advertisement slot selection, planning, purchase, estimate and spot planning) of an existing spot CM is performed based on a predetermined advertisement placement pattern (e.g., Patent Literature 1).

CITATION LIST

Non-Patent Literature

Patent Literature 1: JP 2000-124867 A

SUMMARY OF INVENTION

Technical Problem

However, there is a restriction that existing spot CM planning (that may be referred to as spot planning) needs to conform to an existing placement pattern, and therefore there is a task that it is not possible to provide flexible planning.

It is therefore one of objects of the present disclosure to provide a cost calculation system, a cost calculation apparatus and a program that can suitably realize more flexible planning.

Solution to Problem

A cost calculation system according to one aspect of the present disclosure includes: an obtaining section that obtains information for identifying an effective zone including an advertisement slot in which a spot Commercial Message (CM) is desired to be intensively broadcast; and a control section that calculates cost per Gross Rating Point (GRP) in a case where the spot CM is intensively allocated to the effective zone.

Advantageous Effects of Invention

According to one aspect of the present disclosure, it is possible to suitably realize more flexible planning.

BRIEF DESCRIPTION OF DRAWINGS

FIG. 3 is a diagram illustrating one example of setting of ESP zones.

FIG. 4 is a diagram illustrating one example of zone biases.

FIG. 5 is a diagram illustrating one example of coefficients used to derive cost considering the EPS zones.

DESCRIPTION OF EMBODIMENTS

Figure 1:
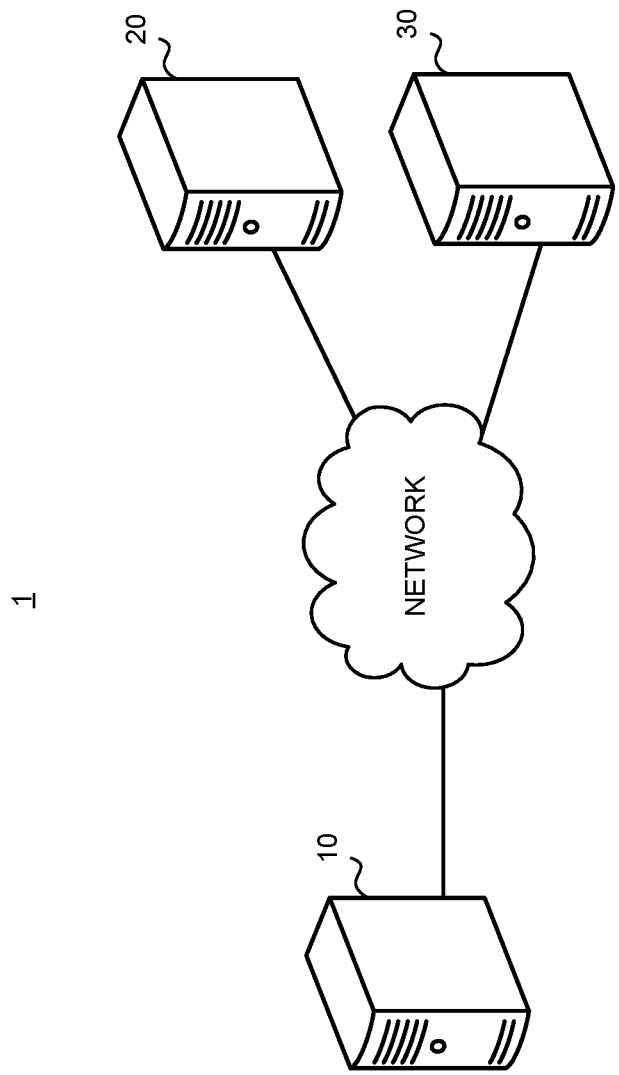
FIG. 1 is a diagram illustrating an example of a schematic structure of a cost calculation system according to one embodiment.

Conventionally, spot CM planning (that may be referred to as, for example, purchase, estimate and spot planning) is performed based on a household rating point in a case where a predetermined advertisement placement pattern is assumed. The advertisement placement pattern is, for example, a reverse L type, an all-day type, an inverted E shape type, an inverted C shape type, a bar shape type, a midnight type and an all-day noon type. In this regard, in the present disclosure, the advertisement placement pattern may be read as, for example, a placement pattern, a development pattern, an advertisement pattern and a sales pattern.

Spot CM planning is generally performed in a unit of a Gross Rating Point (GRP). Cost per GRP is referred to as cost per rating. Generally, the cost per rating differs per placement pattern. A fee of a spot CM in a case where a certain placement pattern is selected may be calculated based on a GRP×cost per rating.

However, there is a restriction that conventional spot CM planning needs to conform to a predetermined placement pattern, and therefore there is a task that flexible planning cannot be provided. Although, in a case where, for example, a spot CM needs to be intensively aired for specific targets, it is thought to be effective to allocate a CM only to programs of specific genres, yet there is not a calculation method of cost per rating that matches such allocation.

Hence, the inventors of the present invention have conceived a cost calculation method that supports flexible spot CM allocation.

An embodiment of the present disclosure will be described in detail below with reference to the accompanying drawings. The same reference numerals will be assigned to the same components in the following description. The same components have the same names and functions, and therefore detailed description thereof will not be repeated.

Cost Calculation System

FIG. 1 is a diagram illustrating an example of a schematic structure of a cost calculation system according to one embodiment. A cost calculation system 1 illustrated in FIG. 1 includes a cost calculation apparatus 10, a broadcast distribution apparatus 20 and a rating point management apparatus 30.

The cost calculation apparatus 10 is an apparatus that derives cost according to a method described later. The cost calculation apparatus 10 is referred to simply as the calculation apparatus 10 below.

The calculation apparatus 10 may be a portable terminal (mobile communication terminal) such as a mobile telephone, a smartphone and a tablet terminal, or may be a fixed communication terminal such as a Personal Computer (PC) and a server. That is, the calculation apparatus 10 according to the present disclosure can be read as a communication device.

The calculation apparatus 10 may communicate with a network (such as the Internet) by wired connection and/or wireless connection (e.g., Long Term Evolution (LTE), New Radio (NR) and Wi-Fi (registered trademark)).

The broadcast distribution apparatus 20 is an apparatus that distributes broadcast to a television (TV). In this regard, the television (television receiver) may be an apparatus that includes a function of receiving at least one of terrestrial broadcasting, broadcasting by a Broadcasting Satellite (BS)/Communications Satellite (CS) and Internet broadcasting (Internet television). The television may be, for example, a multifunctional television, a smart TV, an Internet Protocol (IP) TV and a set-top box.

In this regard, broadcasting means transmission of telecommunications that intends to be publicly received directly, and may include radio broadcasting and Internet broadcasting.

The rating point management apparatus 30 is an apparatus that adds up actual rating points of programs broadcast by the television, The rating point may be stored in a given time unit (e.g., seconds, minutes and hours). The rating point management apparatus 30 may transmit information related to a rating point to another apparatus (e.g., calculation apparatus 10) via the network.

The rating point management apparatus 30 may be an apparatus that is managed by, for example, a television rating point researcher. The rating point management apparatus 30 may obtain and manage viewing history data from measurement devices connected with televisions of given households (e.g., research cooperation households). In this regard, a rating point may be calculated or predicted from the data.

The rating point management apparatus 30 may record a rating point (target individual rating point) per given target (a user corresponding to a given attribute).

In addition, the present disclosure assumes that a target is a sex/age category (a Child (C) layer, a Teen (T) layer, Male (M) 1 to M3 layers and Female (F) 1 to F3 layers) used in a marketing field, yet is not limited to this classification.

Examples of a functional structure and a hardware structure of each apparatus such as the calculation apparatus 10 will be described later.

In addition, the system structure is exemplary, and is not limited to this. For example, although each apparatus is configured to be included one by one in FIG. 1, the number of each device is not limited to this, and there may be a plurality of devices. The cost calculation system 1 may employ a structure that does not include part of the apparatuses, or may employ a structure where functions of one apparatus are realized by a plurality of apparatuses.

There may be a structure where functions of a plurality of apparatuses are realized by one apparatus. At least two of, for example, the calculation apparatus 10, the broadcast distribution apparatus 20 and the rating point management apparatus 30 may be implemented on one server.

Cost Calculation Method

A cost calculation method according to the one embodiment of the present disclosure will be described below. Each cost calculation method may be applied to the above-described cost calculation system.

Figure 2:
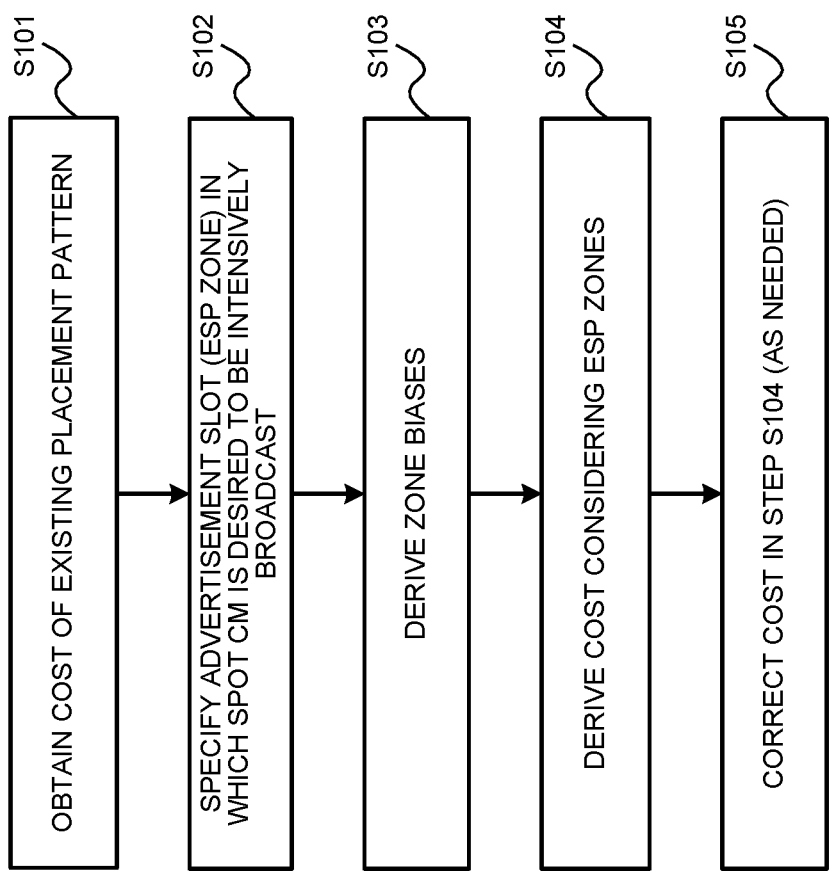
FIG. 2 is a diagram illustrating one example of a flowchart of a cost calculation method according to the one embodiment.

FIG. 2 is a diagram illustrating an example of a flowchart of the cost calculation method according to the one embodiment.

In step S101, the calculation apparatus 10 obtains cost per spot CM placement pattern in a given period (e.g., one week) of a certain broadcast station (that may be read as a channel). In this regard, the cost according to the present disclosure may mean cost per rating that indicates a fee per GRP (1%) in rating point.

The placement pattern may include following existing placement patterns ("placement pattern name: one example of time zone"):
  All Time Table (ATT): Entire broadcast time,
  All day: 6 to 26 o'clock on arbitrary day,
  Inverted E shape: 6 to 9 o'clock, 12 to 14 o'clock and 19 to 26 o'clock on weekday and 6 to 26 o'clock on Saturday and Sunday,
  Inverted C shape: 6 to 9 o'clock and 19 to 26 o'clock on weekday and 6 to 26 o'clock on Saturday and Sunday,
  Reverse L: 19 to 26 o'clock on weekday and 6 to 26 o'clock on Saturday and Sunday,
  Bar shape: 19 to 26 o'clock on weekday, and Saturday and Sunday,
  Only A time: 19 to 23 o'clock on weekday, and Saturday and Sunday, and
  A time 1 slot: Only 1 slot included in A time.

The calculation apparatus 10 may obtain cost of each placement pattern and time zones that make up the placement pattern based on an input (e.g., setting by a broadcast station) from an outside. The present disclosure will be described assuming that the above-described cost of each placement pattern has been obtained as follows, yet is not limited to this:
  ATT: ¥150,000,
  All day: ¥160,862,
  Inverted E shape: ¥177,758,
  Inverted C shape: ¥195,386,
  Reverse L: ¥215,327,
  Bar shape: ¥258,146,
  Only A time: ¥274,906, and
  A time 1 slot: ¥300,000 (in this regard, a unit price of the A time 1 slot (that may be referred to as an A time 1 unit price) is ¥3,900,000, and a slot of 13% in rating point is assumed).

The calculation apparatus 10 may obtain (e.g., receive) information for deriving the above cost. For example, the calculation apparatus 10 may obtain (receive) information of a rating point related to each advertisement slot (that is, for example, a household rating point, an individual rating point and an entire individual rating point, and is a rating point (that may be referred to as "ALL & Program+Commercial 7 (P+C7)") obtained by adding up real time viewing and time shift viewing seven days after broadcasting).

The calculation apparatus 10 may derive cost of the A time 1 slot based on, for example, the setting of the A time 1 unit price of the broadcast station and information of the rating point obtained from the rating point management apparatus 30.

In step S102, the calculation apparatus 10 specifies an advertisement slot in which a spot CM of a certain advertiser is desired to be intensively broadcast in a given period of the above broadcast station. The advertisement slot may be referred to as an Effective Spot Planning (ESP) zone, an effective target zone, an effective zone and an effective area (referred to as an ESP zone below). In addition, in the present disclosure, the advertisement slot may be read as a time zone or a zone.

The calculation apparatus 10 may specify the above ESP zone based on an input (e.g., setting by the advertiser) from an outside. The ESP zone may correspond to a slot whose individual rating point of a specific target is high. The individual rating point of the target may mean a rate of viewers of a certain target layer with respect to all individuals corresponding to the certain target layer.

FIG. 3 is a diagram illustrating one example of setting of ESP zones. A table (time table) in FIG. 3 illustrates ESP zones set to advertisement slots of a certain broadcast station.

In this example, although advertisement slots are divided per day of a week (Monday to Sunday) and per hour (between 5 and 29 o'clock), an advertisement slot position and classification method are not limited to these. In this regard, the example based on the time table illustrated in FIG. 3 will be described continuously below.

In FIG. 3, advertisement slots between 17 and 20 o'clock (from 17 o'clock to 20 o'clock) on Thursday and Friday are indicated as ESP zones. Other advertisement slots are zones (non-ESP zones) that do not correspond to the ESP zones.

In step S103, the calculation apparatus 10 derives a zone bias of each advertisement slot in the given period of the above broadcast station. In this regard, a zone bias of a certain advertisement slot corresponds to a cost increase ratio in a case where the advertisement slot is changed from the ESP zone to the non-ESP zone, and may be referred to as an increase bias.

The zone bias may be derived based on cost of a placement pattern (and time zones that make up the placement pattern) obtained in step S101. In a case where a certain placement pattern (first placement pattern) becomes another placement pattern (second placement pattern) by removing an advertisement slot from the certain placement pattern, a zone bias per advertisement slot to be removed may be derived based on cost of the first placement pattern, cost of the second placement pattern and the number of advertisement slots to be removed. The zone bias per advertisement slot to be removed may be derived according to, for example, following equation 1.

Zone bias=(cost of second placement pattern/cost of first placement pattern)^(1/the number of advertisement slots to be removed)     (Equation 1)

In this regard, "^" is a symbol that indicates exponentiation. In this regard, a zone bias deriving equation is not limited to this, and may be determined such that, as, for example, the number of advertisement slots to be removed becomes larger, the zone bias becomes greater or less.

The zone biases will be specifically described with reference to FIG. 4. FIG. 4 is a diagram illustrating one example of the zone biases. This example illustrates a value of the zone bias of each advertisement slot. In FIG. 4, time zones are categorized by broken lines for ease of description. These times will be described as follows for the sake of convenience.

First time zone: between 5 and 6 o'clock and between 26 and 29 o'clock on weekday, and Saturday and Sunday (corresponding to advertisement slots of above-described first placement pattern=ATT and second placement pattern=all day to be removed), Second time zone: between 9 and 12 o'clock and between 14 and 19 o'clock on weekday (corresponding to advertisement slots of above-described first placement pattern=all day and second placement pattern=inverted E shape to be removed), Third time zone: between 12 and 14 o'clock on weekday (corresponding to advertisement slots of above-described first placement pattern=inverted E shape and second placement pattern=inverted C shape to be removed), Fourth time zone: between 6 and 9 o'clock on weekday (corresponding to advertisement slots of above-described first placement pattern=inverted C shape and second placement pattern=reverse L to be removed), Fifth time zone: between 6 and 19 o'clock on Saturday and Sunday (corresponding to advertisement slots of above-described first placement pattern=reverse L and second placement pattern=bar shape to be removed), and Sixth time zone: between 23 and 26 o'clock on weekday, and Saturday and Sunday (corresponding to advertisement slots of above-described first placement pattern=only A time and second placement pattern=A time 1 slot to be removed).

In the example in FIG. 4, zone biases in the first to sixth time zones are 1.0025, 1.0025, 1.0095, 1.0065, 1.0070, 1.0030 and 1.0032, respectively.

For example, the placement pattern changes from the ATT to the all day by excluding 28 slots belonging to the first time zone from all time zones, and therefore when applied to equation 1, the zone bias of the first time zone is calculated as (160,862/150,000)^(1/28)=1.0025.

Furthermore, the placement pattern changes from the only A time to the A time 1 slot by excluding 27 slots of 28 slots belonging to the sixth time zone from a time zone of the only A time, and therefore when applied to equation 1, the zone bias of the first time zone is calculated as (300,000/274,906)^(1/27)=1.0032.

Next, in step S104, the calculation apparatus 10 derives cost considering the ESP zones specified in step S102.

FIG. 5 is a diagram illustrating one example of coefficients used to derive cost considering ESP zones. As illustrated in this example, a set of the coefficients corresponds to a set in which values of zone biases of the ESP zones illustrated in FIG. 3 are 1, and values of zone biases of the non-ESP zones are left as they are in the set of the zone biases in FIG. 4.

As the cost considering the ESP zones, the calculation apparatus 10 may derive a value obtained by multiplying cost of the ATT (¥150,000) on a value obtained by multiplying all values illustrated in FIG. 5. In this example, the cost considering the ESP zones=¥291,014 is found.

In this regard, the cost of the ATT does not need to be directly used to derive the cost in step S104. For example, the cost considering the ESP zones may be calculated as a value obtained by multiplying cost of the all day on a value obtained by multiplying all values except those in the first time zone from FIG. 5.

It is assumed that the zone biases are determined to make it possible to derive the cost in step S104 based on any placement pattern. That is, the cost considering the ESP zones may be derived by a product of cost of a certain placement pattern and a value obtained by multiplying all values of the zone biases of the non-ESP zones included in a time zone associated with the certain placement pattern.

In step S105, the calculation apparatus 10 may correct (adjust) the cost calculated in step S104 as needed. Although, for example, the cost calculated in step S104 is cost where it is assumed that spot CMs are allocatable only to the ESP zones (no spot CM is allocated to the non-ESP zones), if some spot CMs are allocatable to the non-ESP zones, a degree of freedom of CM adjustment becomes high from a viewpoint of a broadcast station, so that it is possible to reduce cost.

How many spot CMs are allocated to the ESP zones (a rate of the spot CMs to be allocated to the ESP zones among spot CMs to be allocated to the ESP zones and the non-ESP zones) may be referred to as an ESP zone containing ratio. The calculation apparatus 10 may obtain the ESP zone containing ratio based on an input (e.g., setting by the broadcast station) from an outside. In a case where, for example, an ordered GRP is 1000 GRP, and ESP zone containing ratio=70% holds, spot planning is performed at a rate of 700 GRPs for the ESP zones and 300 GRPs for the non-ESP zones.

As described above, as the ESP zone containing ratio becomes lower, the cost is expected to become lower, which may be taken into account for the correction in step S105. For example, the calculation apparatus 10 may derive a cost decrease bias based on the ESP zone containing ratio, and calculate final cost by multiplying the cost decrease bias on the cost derived in step S104.

The cost decrease bias may be given by a function where, for example, the cost decrease bias is 100% in a case of above containing ratio=100%, and decreases Y % (e.g., Y=5) every time the containing ratio decreases X % (e.g., X=10).

Furthermore, in a case where the number of ESP zones (the number of advertisement slots corresponding to the ESP zones) is small, the degree of freedom of CM adjustment decreases and cost increases, which may be taken into account for the correction in step S105. For example, the calculation apparatus 10 may derive a cost increase bias based on the number of ESP zones, and calculate final cost by multiplying the cost increase bias on the cost derived in step S104.

The cost increase bias is 100% in a case of, for example, the number of ESP zones>40, and may be 105%, 110%, 115% and 120%, respectively, when the numbers of ESP zones are 40 or less, 30 or less, 20 or less and 10 or less. Bias values are not limited to these.

One of the correction of the cost increase bias and the correction of the cost decrease bias in step S105 may be applied, both thereof may be applied, or both thereof may not be applied.

When one or more ESP zones are set, the calculation apparatus 10 may compare the final cost corrected in step S105, and determine a preferable advertisement placement (e.g., budget allocation to each broadcast station, an appropriate ESP zone and an advertisement placement pattern). The calculation apparatus 10 may transmit to the broadcast distribution apparatus 20 control information for broadcasting spot CMs based on the determined advertisement placement.

According to the above-described one embodiment, it is possible to suitably determine cost for flexibly allocating spot CMs.

Others

Although the example where the cost calculation method according to the above-described embodiment is applied to television CMs has been described, the embodiment is not limited to this. The above-described embodiment of the present disclosure may be applied, for example, radio CMs and CMs of Internet streaming. One of ordinary skilled in the art can differently read and understand the description of the above-described embodiment as needed. In a case where the embodiment is applied to radio CMs, the rating point according to the present disclosure may be read as a listener rating point.

The "GRP" according to the present disclosure may be read as an index related to other gross rating points.

In addition, the present disclosure covers contents that the "rating point" is read as specific indices (or an improvement degree of the specific indices or an offset), too. The specific index may be, for example, an index for deciding an advertisement effect, and an interim index for improving a Key Performance Indicators (KPI) of an advertiser, and may include, for example, a recognition rate, reach, a Return On Advertising Spend (ROAS) and a Return on Investment (ROI). At least part of the described "rating points" may be read as one of the above specific indices.

Structure of Device

Figure 6:
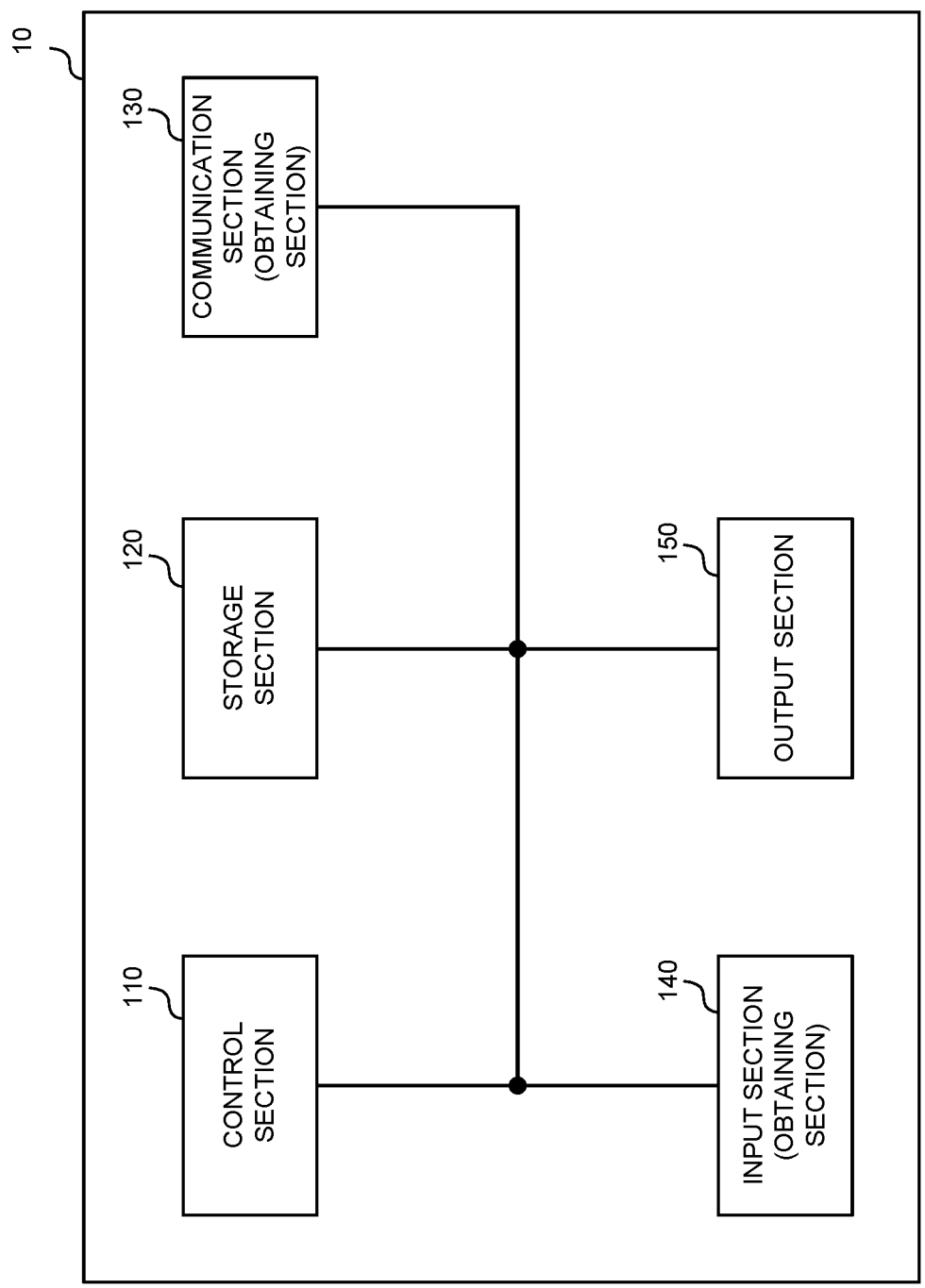
FIG. 6 is a diagram illustrating one example of a functional structure of a calculation apparatus according to the one embodiment.

FIG. 6 is a diagram illustrating one example of a functional structure of the calculation apparatus according to the one embodiment. As illustrated in this example, the calculation apparatus 10 includes a control section 110, a storage section 120, a communication section 130, an input section 140 and an output section 150. In addition, this example mainly illustrates function blocks of characteristic portions according to the present embodiment, and the calculation apparatus 10 may include other function blocks, too, that are necessary for other processing. Furthermore, the calculation apparatus 10 may employ a structure that does not include part of the function blocks.

The control section 110 controls the calculation apparatus 10. The control section 110 can be composed of a controller, a control circuit or a control apparatus described based on the common knowledge in the technical field according to the present disclosure.

The storage section 120 stores (retains) information used by the calculation apparatus 10. The storage section 120 can be composed of, for example, a memory, a storage or a storage apparatus described based on the common knowledge in the technical field according to the present disclosure.

The communication section 130 communicates with another communication device (such as a device or a server) via a network. The communication section 130 may output various pieces of received information to the control section 110.

The communication section 130 can be composed of a transmitter/receiver, a transmission/reception circuit or a transmission/reception apparatus described based on the common knowledge in the technical field according to the present disclosure. In addition, the communication section 130 may be composed of a transmission section and a reception section.

The input section 140 accepts an input of an operation from the user. Furthermore, the input section 140 may be connected with a given device or a storage medium, and accept an input of data. The input section 140 may output an input result to, for example, the control section 110.

The input section 140 can be composed of an input apparatus such as a keyboard, a mouse or a button, an input/output terminal and an input/output circuit described based on the common knowledge in the technical field according to the present disclosure. Furthermore, the input section 140 may be a component (e.g., touch panel) integrated with a display section.

The output section 150 outputs data and content in a format that the user can perceive. For example, the output section 150 may be configured to include, for example, the display section that displays an image, and a sound output section that outputs a sound.

The display section can be composed of, for example, a display apparatus such as a display and a monitor described based on the common knowledge in the technical field according to the present disclosure. Furthermore, the sound output section can be composed of an output apparatus such as a speaker described based on the common knowledge in the technical field according to the present disclosure.

The output section 150 can be configured to include, for example, an operation unit, an operation circuit, an operation apparatus, a player, an image/video/sound processing circuit, an image/video/sound processing apparatus and an amplifier described based on the common knowledge in the technical field according to the present disclosure.

In this regard, the communication section 130 or the input section 140 may be referred to as an obtaining section. The obtaining section may obtain information (e.g., setting information provided by an advertiser) for identifying an effective zone (ESP zone) including an advertisement slot in which a spot Commercial Message (CM) is desired to be intensively broadcast.

The control section 110 may perform processing based on the steps illustrated in FIG. 2. For example, the control section 110 may calculate cost (e.g., cost per Gross Rating Point (GRP)) in a case where a spot CM is intensively allocated to the effective zone.

The control section 110 may derive the cost by a product of cost of a certain placement pattern and a value obtained by multiplying all of a value of a zone bias of each advertisement slot except the effective zones included in the time zone associated with the certain placement pattern. In this regard, a zone bias of a certain advertisement slot may correspond to a cost increase ratio in a case where the advertisement slot is changed from the effective zone to the non-effective zone.

When the first placement pattern becomes the second placement pattern by removing the advertisement slot from the first placement pattern, the control section 110 may derive a zone bias per advertisement slot to be removed based on cost of the first placement pattern, cost of the second placement pattern and the number of the advertisement slots to be removed (based on, for example, above-described equation 1).

The control section 110 may adjust the cost based on a rate to allocate a spot CM to the effective zone among all advertisement slots.

The control section 110 may adjust the cost based on the number of advertisement slots corresponding to the effective zones.

The broadcast distribution apparatus 20 and the rating point management apparatus 30 may also employ the same structure as that in FIG. 6. One of ordinary skilled in the art can differently read and understand description related to the calculation apparatus 10 in the description of FIG. 6 as appropriate.

Some components will be exemplified and described below. In this regard, a reference numeral of each apparatus corresponding to each function block in FIG. 6 is illustrated by applying to a number of the first digit in FIG. 6 a number of a first digit (e.g., "2" that is the first digit of "20" in a case of the broadcast distribution apparatus 20) of a reference numeral that indicates each apparatus.

A communication section 230 of the broadcast distribution apparatus 20 may receive, from the calculation apparatus 10, control information for broadcasting a spot CM based on advertisement placement determined by using calculated cost. A control section 210 of the broadcast distribution apparatus 20 may determine a spot CM that is broadcast in a given time zone based on the above control information. The communication section 230 of the broadcast distribution apparatus 20 may distribute (transmit) the spot CM.

A control section 310 of the rating point management apparatus 30 may derive information related to a rating point based on an unillustrated television viewing log. A communication section 330 of the rating point management apparatus 30 may transmit the information related to the rating point to the calculation apparatus 10.

Hardware Structure

In addition, the block diagrams used to describe the above embodiment illustrate blocks in function units. These function blocks (components) are realized by an arbitrary combination of hardware components and/or software components. Furthermore, means for realizing each function block is not limited in particular. That is, each function block may be realized by using one physically coupled apparatus, or may be realized by connecting two or more physically separate apparatuses by wired connection or radio connection and using a plurality of these apparatuses.

Figure 7:
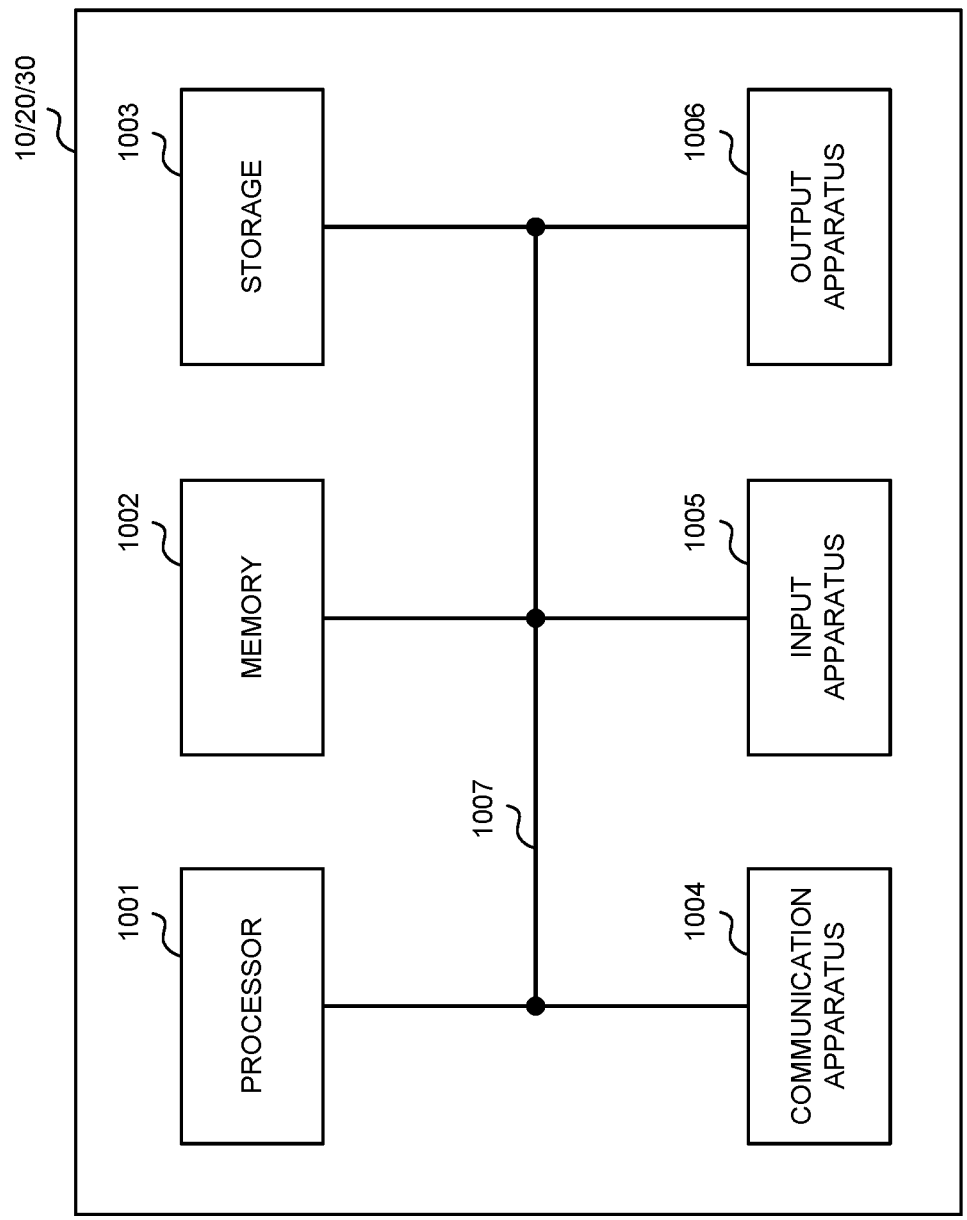
FIG. 7 is a diagram illustrating one example of a hardware structure of, for example, the calculation apparatus according to the embodiment.

For example, the apparatuses (such as the calculation apparatus 10) according to the one embodiment of the present disclosure may function as computers that perform processing of the cost calculation method according to the present disclosure. FIG. 7 is a diagram illustrating one example of the hardware structure of the calculation apparatus according to the one embodiment. The above-described calculation apparatus 10 and broadcast distribution apparatus 20 may be each physically configured as a computer apparatus that includes a processor 1001, a memory 1002, a storage 1003, a communication apparatus 1004, an input apparatus 1005, an output apparatus 1006 and a bus 1007.

In this regard, an apparatus, a circuit, a device, a unit and a server in the present disclosure can be interchangeably read. The hardware structures of the calculation apparatus 10 and the broadcast distribution apparatus 20 may be configured to include one or a plurality of apparatuses illustrated in FIG. 7, or may be configured without including part of the apparatuses.

For example, FIG. 7 illustrates the only one processor 1001. However, there may be a plurality of processors. Furthermore, processing may be executed by 1 processor, or processing may be executed by 2 or more processors simultaneously or successively or by using another method. In addition, the processor 1001 may be implemented by 1 or more chips.

Each function of, for example, the calculation apparatus 10 and the broadcast distribution apparatus 20 is realized by causing hardware such as the processor 1001 and the memory 1002 to read given software (program), and thereby causing the processor 1001 to perform an operation, and control communication via the communication apparatus 1004 and control reading and/or writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, each section such as the above-described control section 110 may be realized by the processor 1001.

Furthermore, the processor 1001 reads programs (program codes), software modules or data from at least one of the storage 1003 and the communication apparatus 1004 out to the memory 1002, and executes various types of processing according to these programs, software modules or data. As the programs, programs that cause the computer to execute at least part of the operations described in the above-described embodiment are used. For example, the control section 110 (210) may be realized by a control program that is stored in the memory 1002 and operates on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as, for example, a register, a cache or a main memory (main storage apparatus). The memory 1002 can store programs (program codes) and software modules that can be executed to perform the method according to the one embodiment.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus. In addition, the above-described storage section 120 may be realized by the memory 1002 and/or the storage 1003.

The communication apparatus 1004 is hardware (transmission/reception device) that performs communication between computers via at least one of a wired network and a radio network, and is also referred to as, for example, a network device, a network controller, a network card and a communication module. The communication apparatus 1004 may include a SIM card. In addition, the above-described communication section 130 may be realized by the communication apparatus 1004.

The input apparatus 1005 is an input device (e.g., a keyboard or a mouse) that accepts an input from an outside. The output apparatus 1006 is an output device (e.g., a display or a speaker) that sends an output to the outside. In addition, the input apparatus 1005 and the output apparatus 1006 may be an integrated component (e.g., touch panel). In addition, the above-described input section 140 and output section 150 may be realized by the input apparatus 1005 and the output apparatus 1006, respectively.

Furthermore, each apparatus such as the processor 1001 or the memory 1002 is connected by the bus 1007 that communicates information. The bus 1007 may be composed by using a single bus, or may be composed by using different buses between apparatuses.

Furthermore, the calculation apparatus 10 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or entirety of each function block. For example, the processor 1001 may be implemented by using at least one of these hardware components.

MODIFIED EXAMPLE

In addition, each term that has been described in the present disclosure and/or each term that is necessary to understand the present disclosure may be replaced with terms having identical or similar meanings.

The information and the parameters described in the present disclosure may be expressed by using absolute values, may be expressed by using relative values with respect to given values, or may be expressed by using other corresponding information. Furthermore, names used for parameters in the present disclosure are in no respect restrictive names.

The information and the signals described in the present disclosure may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or arbitrary combinations of these.

The information and the signals may be input and output via a plurality of network nodes. The input and output information and signals may be stored in a specific location (e.g., memory) or may be managed by using a management table. The information and signals to be input and output can be overridden, updated or additionally written. The output information and signals may be deleted. The input information and signals may be transmitted to other apparatuses.

Furthermore, notification of given information (e.g., notification of "being X") is not limited to explicit notification, and may be performed implicitly (by, for example, not performing notification of the given information or by performing notification of another information).

Irrespectively of whether software is referred to as software, firmware, middleware, a microcode or a hardware description language or is referred to as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via at least one of transmission media and a signal waveform. When, for example, the software is transmitted from websites, servers or other remote sources by using at least ones of wired techniques (e.g., coaxial cables, optical fiber cables, twisted pairs and Digital Subscriber Lines (DSLs)) and radio techniques (e.g., infrared rays and microwaves), at least ones of these wired techniques and radio techniques are included in a definition of the transmission media.

The terms "system" and "network" used in the present disclosure can be interchangeably used.

Each aspect/embodiment described in the present disclosure may be used alone, may be used in combination or may be switched and used when carried out. Furthermore, orders of the processing procedures, the sequences and the flowchart according to each aspect/embodiment described in the present disclosure may be rearranged unless contradictions arise. For example, the method described in the present disclosure presents various step elements by using an exemplary order, and is not limited to the presented specific order.

The phrase "based on" used in the present disclosure does not mean "based only on" unless specified otherwise. In other words, the phrase "based on" means both of "based only on" and "based at least on".

Every reference to elements that use names such as "first" and "second" used in the present disclosure does not generally limit the quantity or the order of these elements. These names can be used in the present disclosure as a convenient method for distinguishing between two or more elements. Hence, the reference to the first and second elements does not mean that only two elements can be employed or the first element should precede the second element in some way.

In a case where the words "include" and "including" and modifications of these words are used in the present disclosure, these words intend to be comprehensive similar to the word "comprising". Furthermore, the word "or" used in the present disclosure intends to not be an exclusive OR.

In a case where, for example, translation adds articles such as a, an and the in English in the present disclosure, the present disclosure may include that nouns coming after these articles are plural.

The invention according to the present disclosure has been described in detail above. However, it is obvious for a person skilled in the art that the invention according to the present disclosure is not limited to the embodiment described in the present disclosure. The invention according to the present disclosure can be carried out as modified and changed aspects without departing from the gist and the scope of the invention defined based on the recitation of the claims. Accordingly, the description of the present disclosure is intended for exemplary explanation, and does not bring any restrictive meaning to the invention according to the present disclosure.

This application claims priority to Japanese Patent Application No. 2020-069945 filed on Apr. 8, 2020, the entire contents of which are incorporated by reference herein.

The invention claimed is:

1. A cost calculation system, comprising:
   at least one of a receiver and an input circuit that obtains:
      information on a cost of each of placement patterns;
      information on a time zone of each of the placement patterns; and
      information for identifying an effective zone including a first advertisement slot in which a spot Commercial Message (CM) is desired to be more intensively broadcast than in a second advertisement slot; and
   a processor that calculates a cost per Gross Rating Point (GRP) in a case where the spot CM is more intensively allocated to the effective zone than in the second advertisement slot, by a product of a cost of a certain placement pattern among the placement patterns and a value obtained by multiplying all of a value of a zone bias of each advertisement slot other than the effective zone included in a time zone associated with the certain placement pattern,
   wherein a zone bias of a certain advertisement slot corresponds to a cost increase ratio in a case where the certain advertisement slot is changed from the effective zone to a non-effective zone, and
   wherein, in a case where a first placement pattern among the placement patterns becomes a second placement pattern among the placement patterns by removing at least one advertisement slot from the first placement pattern, the processor derives a zone bias per advertisement slot to be removed based on a cost of the first placement pattern, a cost of the second placement pattern, and a number of the at least one advertisement slot to be removed.

2. The cost calculation system according to claim 1, wherein the processor adjusts the cost based on a rate to allocate the spot CM to the effective zone among all advertisement slots.

3. The cost calculation system according to claim 1, wherein the processor adjusts the cost based on a number of advertisement slots corresponding to the effective zone.

4. A cost calculation apparatus comprising:
   at least one of a receiver and an input circuit that obtains:
      information on a cost of each of placement patterns;
      information on a time zone of each of the placement patterns; and
      information for identifying an effective zone including a first advertisement slot in which a spot Commercial Message (CM) is desired to be more intensively broadcast than in a second advertisement slot; and
   a processor that calculates a cost per Gross Rating Point (GRP) in a case where the spot CM is more intensively allocated to the effective zone than in the second advertisement slot, by a product of a cost of a certain placement pattern among the placement patterns and a value obtained by multiplying all of a value of a zone bias of each advertisement slot other than the effective zone included in a time zone associated with the certain placement pattern,
   wherein a zone bias of a certain advertisement slot corresponds to a cost increase ratio in a case where the certain advertisement slot is changed from the effective zone to a non-effective zone, and
   wherein, in a case where a first placement pattern among the placement patterns becomes a second placement pattern among the placement patterns by removing at least one advertisement slot from the first placement pattern, the processor derives a zone bias per advertisement slot to be removed based on a cost of the first placement pattern, a cost of the second placement pattern, and a number of the at least one advertisement slot to be removed.

5. A non-transitory computer-readable medium containing a program, the program causing a computer to execute:
   obtaining:
      information on a cost of each of placement patterns;
      information on a time zone of each of the placement patterns; and
      information for identifying an effective zone including a first advertisement slot in which a spot Commercial Message (CM) is desired to be more intensively broadcast than in a second advertisement slot; and
   calculating a cost per Gross Rating Point (GRP) in a case where the spot CM is more intensively allocated to the effective zone than in the second advertisement slot, by a product of a cost of a certain placement pattern among the placement patterns and a value obtained by multiplying all of a value of a zone bias of each advertisement slot other than the effective zone included in a time zone associated with the certain placement pattern,
   wherein a zone bias of a certain advertisement slot corresponds to a cost increase ratio in a case where the certain advertisement slot is changed from the effective zone to a non-effective zone, and
   wherein, in a case where a first placement pattern among the placement patterns becomes a second placement pattern among the placement patterns by removing at least one advertisement slot from the first placement pattern, the program causes the computer to execute deriving a zone bias per advertisement slot to be removed based on a cost of the first placement pattern, a cost of the second placement pattern, and a number of the at least one advertisement slot to be removed.

\* \* \* \* \*